United States Patent
Yoda et al.

(10) Patent No.: US 7,639,940 B2
(45) Date of Patent: Dec. 29, 2009

(54) PHOTOGRAPHY APPARATUS, PHOTOGRAPHY METHOD, AND PHOTOGRAPHY PROGRAM USING LIGHTING CONDITION PARAMETERS

(75) Inventors: Akira Yoda, Ashigarakami-gun (JP); Wataru Ito, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 508 days.

(21) Appl. No.: 11/431,592

(22) Filed: May 11, 2006

(65) Prior Publication Data
US 2006/0269270 A1   Nov. 30, 2006

(30) Foreign Application Priority Data
May 11, 2005   (JP)   ............................. 2005-138565

(51) Int. Cl.
G03B 15/03   (2006.01)
H04N 5/235   (2006.01)
(52) U.S. Cl. .................. 396/155; 396/108; 348/362
(58) Field of Classification Search .................. None
See application file for complete search history.

(56) References Cited

U.S. PATENT DOCUMENTS 6,314,241 B1   11/2001   Matsumura
6,940,545 B1 *   9/2005   Ray et al. ................. 348/222.1

OTHER PUBLICATIONS

T.F. Cootes, et al., "Active Appearance Models", Proc. European Conference on Computer Vision, vol. 2, pp. 484-498, Springer, 1998.

* cited by examiner

Primary Examiner—Jay M Patidar
(74) Attorney, Agent, or Firm—Sughrue Mion, PLLC (57) ABSTRACT

An auxiliary light source such as a flash is controlled for highly accurately reflecting a lighting condition with less effect of a factor other than the lighting condition such as contrasting density caused by shadow or black compression or white compression. For this purpose, a parameter acquisition unit obtains weighting parameters for principal components representing lighting conditions in a face region in an image detected by a face detection unit, by fitting to the detected face region a mathematical model generated according to a method of AAM using a plurality of sample images representing human faces in different lighting conditions. A flash control unit obtains a flash control condition by referring to a reference table according to the parameters, and controls flash light emission according to the control condition.

12 Claims, 8 Drawing Sheets

THE i1^TH PRINCIPAL COMPONENT

THE i2^TH PRINCIPAL COMPONENT

PHOTOGRAPHY APPARATUS, PHOTOGRAPHY METHOD, AND PHOTOGRAPHY PROGRAM USING LIGHTING CONDITION PARAMETERS

BACKGROUND OF THE INVENTION

1. Field of the Invention

The present invention relates to a photography apparatus having a function for controlling light emission from an auxiliary light source such as a flash at the time of photography and to a photography method therefor. The present invention also relates to a program for causing a computer to execute the photography method.

2. Description of the Related Art

There has been known a camera that enables automatic setting of a flash if necessary by predicting how a shadow appears based on direction and strength of sunlight before photography (see U.S. Pat. No. 6,314,241). The camera described in U.S. Pat. No. 6,314,241 has an imaging device for shadow detection under a glass window located in an upper part of the camera. The camera predicts a manner of appearance of shadow changing with direction of sunlight and weather, based on a position and density of a shadow of a black mark formed in the glass window. The camera then controls a photography condition by operating a flash circuit according to a result of the prediction so that no shadow is cast on a subject.

However, the camera described in U.S. Pat. No. 6,314,241 needs special hardware.

Meanwhile, in the case where black compression is observed around a subject or white compression is observed in the background due to presence of backlight at the time of photography with a silver-salt film camera, the subject or the background can be corrected during printing processing because of information remaining on the film. However, a subject has less information in the case of photography with a digital camera than in the case of a silver-salt film camera. Therefore, once black compression or white compression occurs, information on a part of the compression is missing in an image, and the part cannot be corrected later. For this reason, appropriate flash control is desired according to a condition of lighting for a subject.

SUMMARY OF THE INVENTION

The present invention has been conceived based on consideration of the above circumstances. An object of the present invention is therefore to realize appropriate flash control based on a condition of lighting for a subject, without using special hardware therefor.

A first photography apparatus of the present invention comprises:

imaging means for obtaining an image of a subject by photography thereof;

an auxiliary light source for emitting auxiliary light at the time of the photography;

parameter acquisition means for obtaining a weighting parameter for a statistical characteristic quantity representing a lighting condition for a predetermined structure in an input through image by fitting a model representing the structure to the structure in the input through image, the model having been obtained by carrying out predetermined statistical processing on a plurality of images representing the predetermined structure in different lighting conditions, and the model representing the structure by one or more statistical characteristic quantities including the statistical characteristic quantity representing the lighting condition and by weighting parameter or parameters for weighting the statistical characteristic quantity or quantities according to an individual characteristic of the structure; and auxiliary light source control means for controlling the auxiliary light source so as to cause a condition of lighting for the subject to become appropriate according to a value of the weighting parameter having been obtained.

A second photography apparatus of the present invention comprises:

imaging means for obtaining an image of a subject by photography thereof;

parameter acquisition means for obtaining a weighting parameter for a statistical characteristic quantity representing a lighting condition for a predetermined structure in an input through image by fitting a model representing the structure to the structure in the input through image, the model having been obtained by carrying out predetermined statistical processing on a plurality of images representing the predetermined structure in different lighting conditions, and the model representing the structure by one or more statistical characteristic quantities including the statistical characteristic quantity representing the lighting condition and by weighting parameter or parameters for weighting the statistical characteristic quantity or quantities according to an individual characteristic of the structure;

judging means for carrying out judgment as to whether a value of the weighting parameter having been obtained satisfies a predetermined criterion representing a preferable lighting condition; and warning means for carrying out warning in the case where a result of the judgment is negative.

A first photography method of the present invention comprises the steps of:

obtaining a weighting parameter for a statistical characteristic quantity representing a lighting condition for a predetermined structure in an input through image by fitting a model representing the structure to the structure in the input through image, the model having been obtained by carrying out predetermined statistical processing on a plurality of images representing the predetermined structure in different lighting conditions, and the model representing the structure by one or more statistical characteristic quantities including the statistical characteristic quantity representing the lighting condition and by weighting parameter or parameters for weighting the statistical characteristic quantity or quantities according to an individual characteristic of the structure; and controlling an auxiliary light source emitting auxiliary light at the time of photography of a subject so as to cause a condition of lighting for the subject to become appropriate according to a value of the weighting parameter having been obtained.

A second photography method of the present invention comprises the steps of:

obtaining a weighting parameter for a statistical characteristic quantity representing alighting condition for a predetermined structure in an input through image by fitting a model representing the structure to the structure in the input through image, the model having been obtained by carrying out predetermined statistical processing on a plurality of images representing the predetermined structure in different lighting conditions, and the model representing the structure by one or more statistical characteristic quantities including the statistical characteristic quantity representing the lighting condition and by weighting parameter or parameters for weighting the statistical characteristic quantity or quantities according to an individual characteristic of the structure;

carrying out judgment as to whether a value of the weighting parameter having been obtained satisfies a predetermined criterion representing a preferable lighting condition; and carrying out warning in the case where a result of the judgment is negative.

Photography programs of the present invention are programs for causing a computer to execute the first and second photography methods (that is, programs causing a computer to function as the means described above).

Hereinafter, the photography apparatuses, the photography methods, and the photography programs of the present invention will be described in detail.

As a method of generating the model representing the predetermined structure in the present invention, a method of AAM (Active Appearance Model) can be used. An AAM is one of approaches in interpretation of the content of an image by using a model. For example, in the case where a human face is a target of interpretation, a mathematical model of human face is generated by carrying out principal component analysis on face shapes in a plurality of images to be learned and on information of luminance after normalization of the shapes. A face in a new input through image is then represented by principal components in the mathematical model and corresponding weighting parameters, for face image reconstruction (T. F. Cootes et al., "Active Appearance Models", Proc. European Conference on Computer Vision, vol. 2, pp. 484-498, Springer, 1998; hereinafter referred to as Reference 1).

As examples of the lighting condition can be listed the number of light sources (whether the light sources are light sources of a single type or mixed light sources including a plurality of types), a color thereof (color temperature), intensity thereof, and direction thereof. As examples of mixed light sources can be listed a state wherein outside light is mixed with indoor light, a state wherein indirect light is mixed with direct light, a state wherein each of structures in an image is illuminated by different lighting, and a state wherein each part of a structure is illuminated by different lighting.

It is preferable for the predetermined structure to be suitable for modeling. In other words, variations in shape and color of the predetermined structure in images thereof preferably fall within a predetermined range. Especially, it is preferable for the predetermined structure to generate the statistical characteristic quantity or quantities contributing more to the shape and color thereof through statistical processing thereon. Furthermore, it is preferable for the predetermined structure to be a main part of image. More specifically, the predetermined structure can be a human face.

The plurality of images representing the predetermined structure under different lighting conditions may be images obtained by actually photographing the predetermined structure in different lighting conditions. Alternatively, the images may be generated through simulation based on an image of the structure photographed in a specific lighting condition.

It is preferable for the predetermined statistical processing to be dimension reduction processing that can represent the predetermined structure by the statistical characteristic quantity or quantities of fewer dimensions than the number of pixels representing the predetermined structure. More specifically, the predetermined statistical processing may be multivariate analysis such as principal component analysis. In the case where principal component analysis is carried out as the predetermined statistical processing, the statistical characteristic quantity or quantities refers/refer to a principal component/principal components obtained through the principal component analysis.

In the case where the predetermined statistical processing is principal component analysis, principal components of higher orders contribute more to the shape and color than principal components of lower orders.

The statistical characteristic quantity representing the lighting condition may be a single statistical characteristic quantity or a plurality of statistical characteristic quantities.

The input through image refers to an image imaged by the imaging means before an instruction to photograph a still image is input. More specifically, in the case where an image is displayed in the form of a moving image on a monitor of a digital camera before a shutter button is pressed, each frame comprising the moving image is the input through image.

The (predetermined) structure in the input through image may be detected automatically or manually. In addition, the present invention may further comprise the step (or means) for detecting the structure in the input through image. Alternatively, the structure may have been detected in the input through image in the present invention.

Any means may be used as the warning means as long as the means can notify a photographer of the fact that the value of the weighting parameter having been obtained does not satisfy the predetermined criterion representing the preferable lighting condition, through vision or audition. More specifically, audio output or display on a monitor can be used as a method of the warning.

In the present invention, a plurality of models may be prepared for respective properties of the predetermined structure. In this case, the steps (or means) may be added to the present invention for obtaining any one or more of the properties of the structure in the input through image and for selecting one of the models according to the property having been obtained. The weighting parameter can be obtained by fitting the selected model to the structure in the input through image.

The properties refer to gender, age, and race in the case where the predetermined structure is human face. The property may be information for identifying an individual. In this case, the models for the respective properties refer to models for respective individuals.

As a specific method of obtaining the property may be listed image recognition processing having been known (such as image recognition processing described in Japanese Unexamined Patent Publication No. 11(1999)-175724). Alternatively, the property may be inferred or obtained based on information such as GPS information accompanying the image.

Fitting the model representing the structure to the structure in the input through image refers to calculation for representing the structure in the input through image by the model. More specifically, in the case where the method of AAM described above is used, fitting the model refers to finding values of the weighting parameters for the respective principal components in the mathematical model.

In order to control the auxiliary light source based on the weighting parameter having been obtained for the statistical characteristic quantity representing the lighting condition, the value of the weighting parameter needs to be related to a method of controlling the light source. This relationship can be obtained by experimentally and statistically finding the relationship of the value of the weighting parameter with presence or absence of light emitted from the auxiliary light source, intensity of the emission, and a color of light and a light source direction in the case of presence of a plurality of light sources, for example.

According to the first photography apparatus, the first photography method, and the first photography program of the present invention, the weighting parameter for the statistical characteristic quantity representing the lighting condition in the structure in the input through image can be obtained by fitting to the structure in the input through image the model representing the predetermined structure with use of the statistical characteristic quantity or quantities including the statistical characteristic quantity representing the lighting condition and the weighting parameter or parameters therefor. Based on the value of the weighting parameter having been obtained, the auxiliary light source can be controlled so as to cause the condition of lighting for the subject to become appropriate. In this manner, the present invention pays attention to the statistical characteristic quantity representing the lighting condition, and the auxiliary light source is controlled by the appropriate condition according to the weighting parameter corresponding to the statistical characteristic quantity representing the lighting condition for the structure in the input through image. Therefore, the photography can be realized with less effect of black or white compression and contrast caused by shadow.

According to the second photography apparatus, the second photography method, and the second photography program of the present invention, the weighting parameter for the statistical characteristic quantity representing the lighting condition in the structure in the input through image can be obtained by fitting to the structure in the input through image the model representing the predetermined structure with use of the statistical characteristic quantity or quantities including the statistical characteristic quantity representing the lighting condition and the weighting parameter or parameters therefor. Based on the value of the weighting parameter having been obtained, the warning is carried out in the case where the value of the weighting parameter does not satisfy the predetermined criterion representing the preferable lighting condition. Therefore, a photographer can manually adjust an auxiliary light source in the case where the preferable lighting condition is not obtained. Consequently, the photography can be realized with less effect of black or white compression and contrast caused by shadow.

In the case where the step (or the means) for detecting the structure in the input through image is added, automatic detection of the structure can be carried out. Therefore, the photography apparatuses become easier to operate.

In the case where the plurality of models are prepared for the respective properties of the predetermined structure in the present invention while the steps (or the means) are added for obtaining the property of the structure in the input through image and for selecting one of the models in accordance with the property having been obtained, if the weighting parameter is obtained by fitting the selected model to the structure in the input through image, the structure in the input through image can be fit to the model that is more suitable. Therefore, processing accuracy is improved, and the photography can be carried out for a higher quality image.

In the case where the structure is human face, a human face is a main part of image in many cases. Therefore, the auxiliary light source can be controlled to be optimal for the main part, enabling the photography to be more preferable.

DESCRIPTION OF THE PREFERRED EMBODIMENTS

Hereinafter, embodiments of the present invention will be described with reference to the accompanying drawings.

Figure 1:
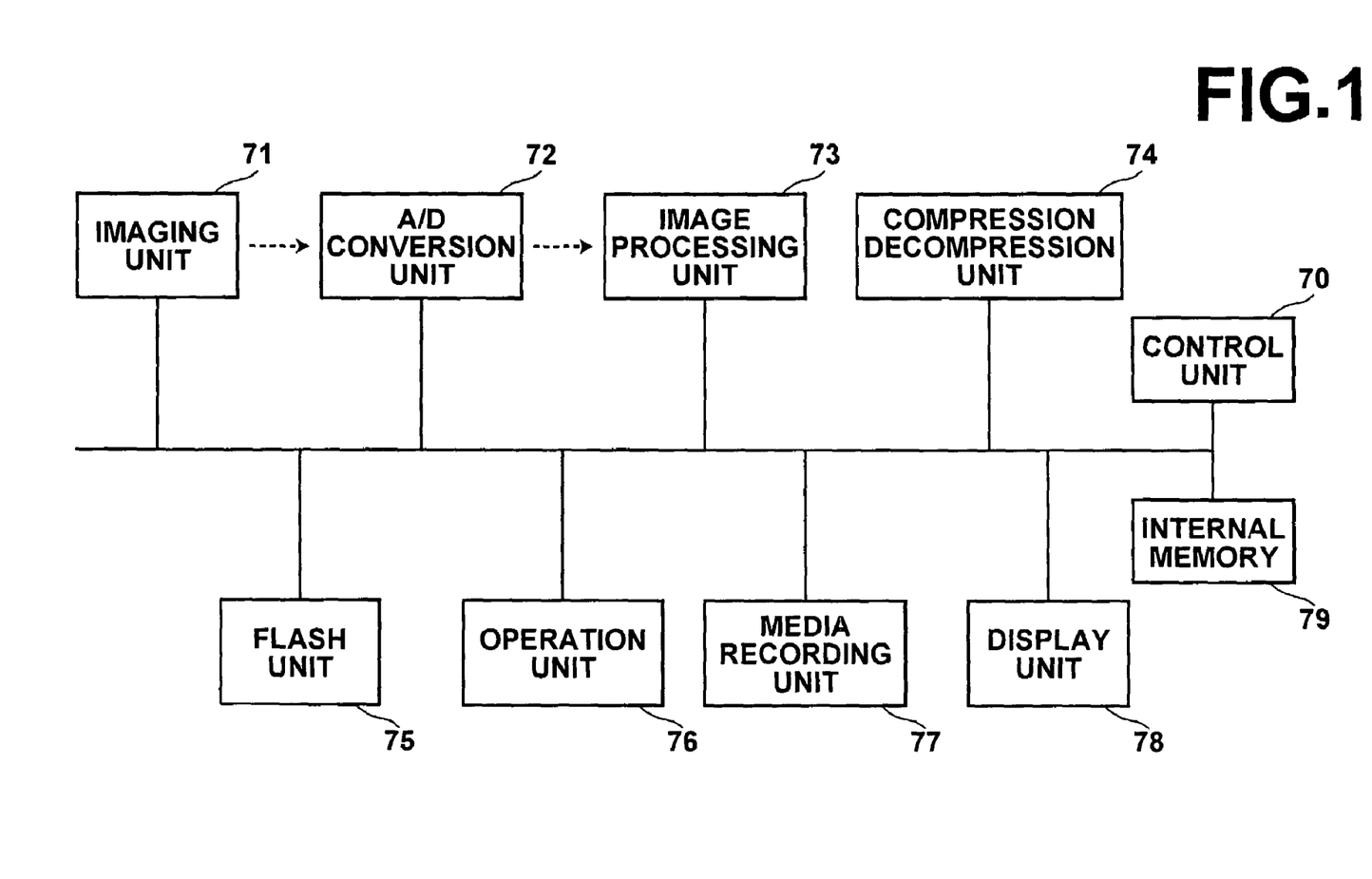
FIG. 1 shows the configuration of a digital camera in an embodiment of the present invention.

FIG. 1 shows the configuration of a digital camera as an embodiment of the present invention. As shown in FIG. 1, the digital camera has an imaging unit 71, an A/D conversion unit 72, an image processing unit 73, a compression/decompression unit 74, a flash unit 75, an operation unit 76, a media recording unit 77, a display unit 78, a control unit 70, and an internal memory 79. The imaging unit 71 comprises a lens, an iris, a shutter, a CCD, and the like, and photographs a subject. The A/D conversion unit 72 obtains digital image data by digitizing an analog signal represented by charges stored in the CCD of the imaging unit 71. The image processing unit 73 carries out various kinds of image processing on image data. The compression/decompression unit 74 carries out compression processing on image data to be stored in a memory card, and carries out decompression processing on image data read from a memory card in a compressed form. The flash unit 75 comprises a flash and the like, and carries out flash emission. The operation unit 76 comprises various kinds of operation buttons, and is used for setting a photography condition, an image processing condition, and the like. The media recording unit 77 is used as an interface with a memory card in which image data are stored. The display unit 78 comprises a liquid crystal display (hereinafter referred to as the LCD) and the like, and is used for displaying a through image, a photographed image, various setting menus, and the like. The control unit 70 controls processing carried out by each of the units. The internal memory 79 stores a control program, image data, and the like.

In cooperation with each of the units of the digital camera, the control unit 70 controls a processing flow regarding an image, such as photography, input, correction, manipulation, and output thereof, by executing the control program stored in the internal memory 79. The control unit 70 also carries out image processing calculation for image correction and manipulation. Processing for controlling the auxiliary light source (the flash unit 75) of the present invention is carried out according to control by the control unit 70.

Operation of the digital camera and the flow of processing therein will be described next.

When a photographer switches on the digital camera, the imaging unit 71 causes light entering the lens from a subject to form an image on a photoelectric surface of the CCD, and outputs an analog image signal after photoelectric conversion. The A/D conversion unit 72 converts the analog image signal output from the imaging unit 71 to a digital image signal, and displays the digital image signal as digital through image data Ps on the display unit 78. The digital through image data Ps are generated by serially imaging the subject at a predetermined frame rate while appropriately thinning signals output from all devices comprising the CCD. By serial display of the image represented by the digital through image data Ps (hereinafter image data and an image represented by the image data are represented by the same reference number) on the display unit 78, the subject is shown in the form of a moving image.

The control unit 70 then carries out processing for controlling the flash unit 75. For realizing this processing, the control unit 70 starts a flash control program stored in the internal memory 79, and carries out flash control processing (which will be described later) using a mathematical model M stored in the internal memory 79.

Thereafter, the photographer fully presses a shutter button, and the imaging unit 71 obtains the image. More specifically, the flash unit 75 operates in a controlled state in response to the shutter button being pressed, and the imaging unit 71 causes the light entering the lens from the subject to form the image on the photoelectric surface of the CCD. After photoelectric conversion, the imaging unit 71 outputs an analog image signal, and the A/D conversion unit 72 converts the analog image signal output from the imaging unit 71 to a digital image signal. The A/D conversion unit 72 then outputs the digital image signal as digital image data P0.

In the image processing unit 73, publicly known image processing such as gradation correction processing, color correction processing, density correction processing, white balance adjustment processing, sharpness correction, and noise reduction and removal is carried out based on the condition set on the digital camera, according to the image processing program executed by the control unit 70. Processed image data P1 are then output.

Figure 2A:
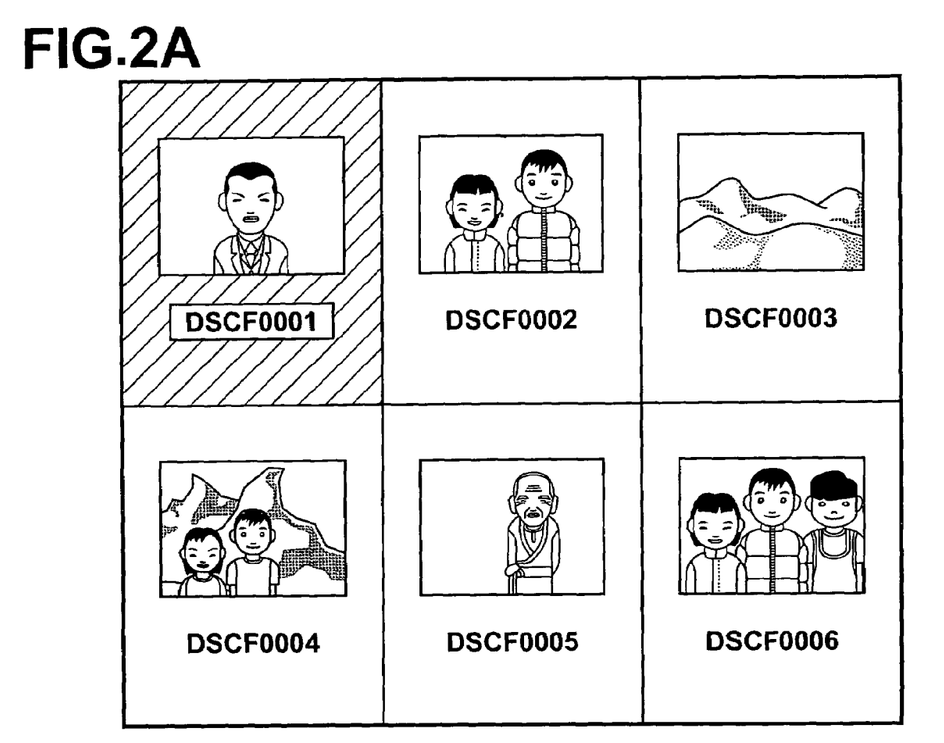
FIGS. 2A and 2B show examples of screens displayed on a display unit of the digital camera in the embodiment.
Figure 2B:
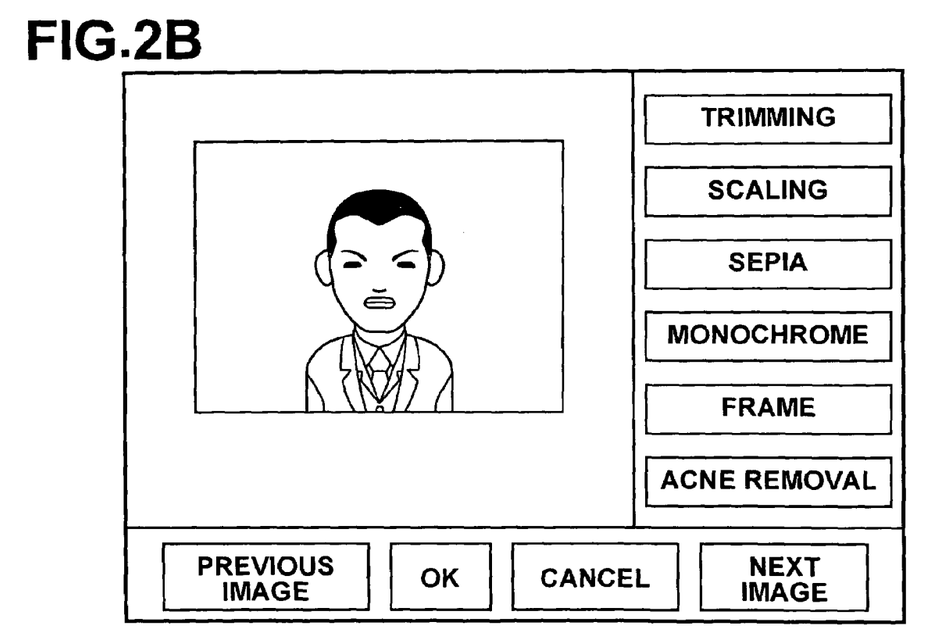

The image P1 is displayed on the LCD by the display unit 78. FIG. 2A shows an example of a screen shown on the LCD. The photographer confirms displayed thumbnail images, and selects any one of the thumbnail images that needs manual image-quality correction or processing for image manipulation while using the operation buttons in the operation unit 76. In FIG. 2A, the image in the upper left corner (DSCF0001) is selected. As shown in FIG. 2B as an example, the selected thumbnail image is enlarged and displayed on the LCD, and buttons are displayed for selecting the content of manual correction and manipulation on the image. The photographer selects a desired one of the buttons by using the operation unit 76, and carries out detailed setting of the selected content if necessary. The image processing unit 73 carries out the image processing according to the selected content, and outputs processed image data P2.

The control program executed by the control unit 70 controls the image display by the display unit 78, the reception of input from the operation unit 76, and the image processing such as manual correction and manipulation.

The compression/decompression unit 74 carries out compression processing on the image data P2 according to a compression format such as JPEG, and the compressed image data are stored via the media recording unit 77 in a memory card inserted in the digital camera.

The manual correction and manipulation may be carried out on the image having been stored in the memory card. More specifically, the compression/decompression unit 74 decompresses the image data stored in the memory card, and the image after the decompression is displayed on the LCD of the display unit 78. The photographer selects desired image processing as has been described above, and the image processing unit 73 carries out the selected image processing.

Figure 3:
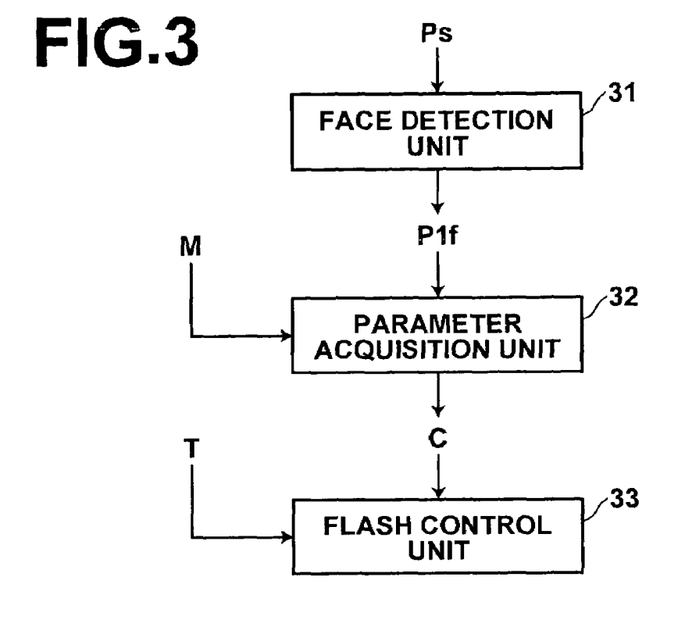
FIG. 3 is a block diagram showing details of flash control processing in one aspect of the present invention.

The flash control processing in the present invention will be described below in detail. FIG. 3 is a block diagram showing details of the flash control processing. The flash control processing is carried out by a face detection unit 31, a parameter acquisition unit 32, and a flash control unit 33. The face detection unit 31 detects a face in the through image Ps (hereinafter referred to as the face region P1$f$). The parameter acquisition unit 32 obtains weighting parameters C for principal components representing lighting conditions in the face region P1$f$ by fitting to the face region P1$f$ the mathematical model M generated by a method of AAM (see Reference 1 described above) based on sample images representing human faces in different lighting conditions. The flash control unit 33 obtains a control condition W for the flash unit 75 with reference to a reference table T according to the parameters C having been obtained by the parameter acquisition unit 32, and controls the flash unit 75 according to the control condition W. The processing described above is carried out according to the control program stored in the internal memory 79.

Figure 4:
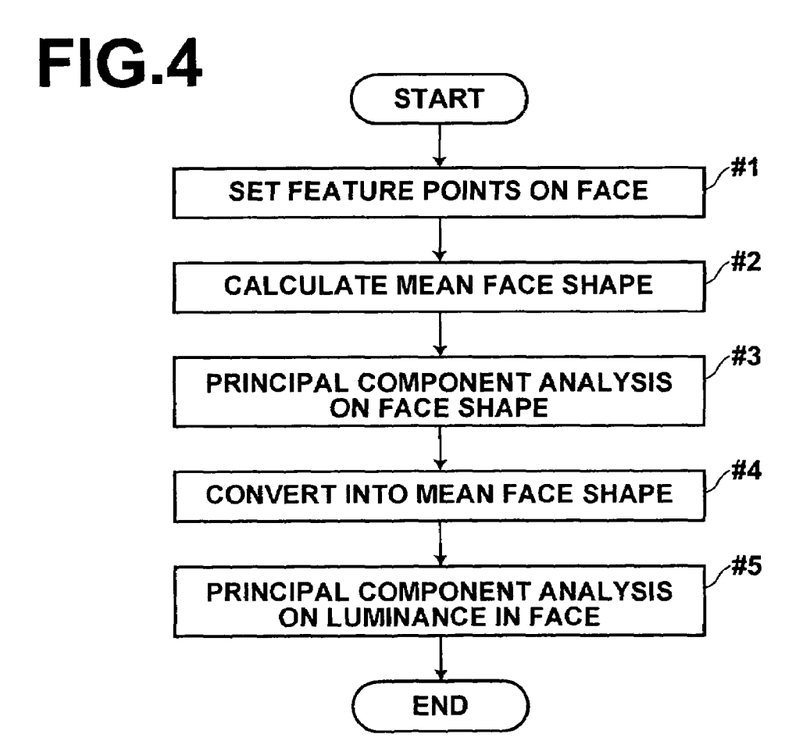
FIG. 4 is a flow chart showing a procedure for generating a mathematical model of face image in the present invention.

The mathematical model M is generated according to a flow chart shown in FIG. 4, and stored in advance in the internal memory 79 together with the programs described above. Hereinafter, how the mathematical model M is generated will be described.

Figure 5:
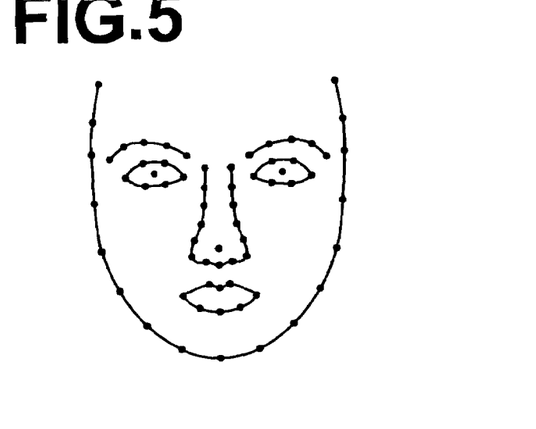
FIG. 5 shows an example of how feature points are set in a face.

For each of the sample images representing human faces in different lighting conditions, feature points are set as shown in FIG. 5 for representing face shape (Step #1). In this example, the number of the feature points is 122. However, only approximately 60 points are shown in FIG. 5 for simplification. Which part of face is represented by which of the feature points is predetermined, such as the left corner of the left eye represented by the first feature point and the center between the eyebrows represented by the 38$^{th}$ feature point. Each of the feature points may be set manually or automatically according to recognition processing. Alternatively, the feature points may be set automatically and later corrected manually upon necessity.

Based on the feature points set in each of the sample images, mean face shape is calculated (Step #2). More specifically, mean values of coordinates of the feature points representing the same part are found among the sample images.

Principal component analysis is then carried out based on the coordinates of the mean face shape and the feature points representing the face shape in each of the sample images (Step #3). As a result, any face shape can be approximated by Equation (1) below:

$$S = S_0 + \sum_{i=1}^{n} p_i b_i \qquad (1)$$

Figure 6:
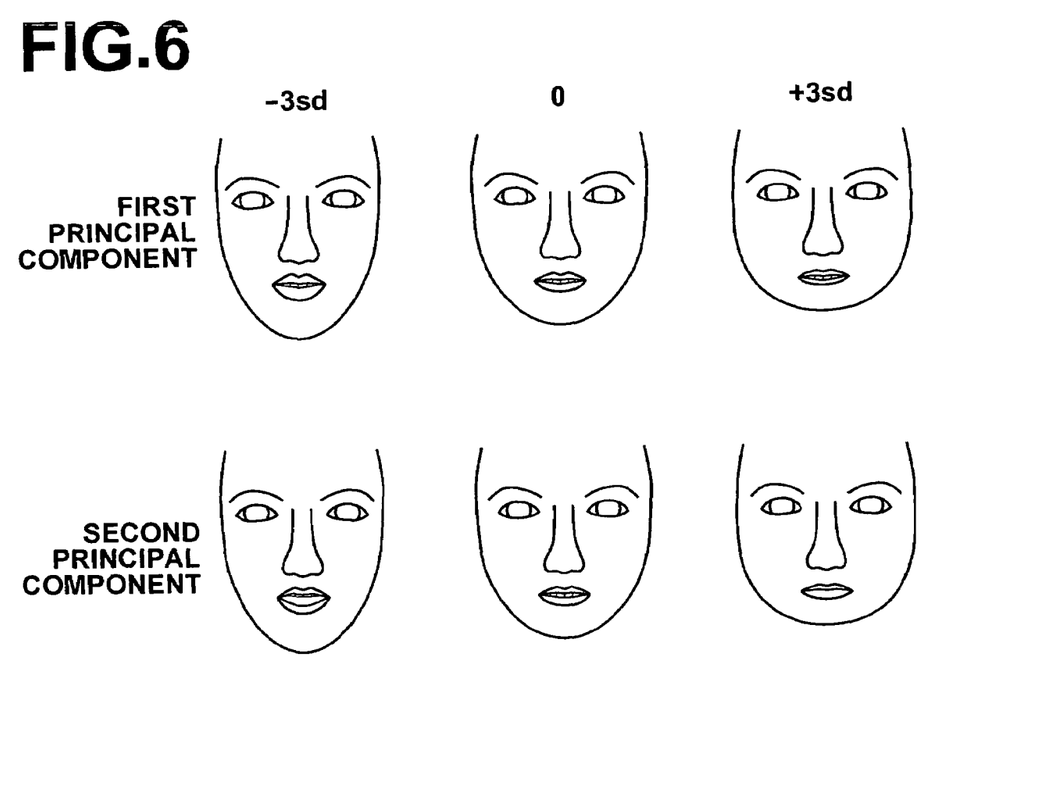
FIG. 6 shows how a face shape changes with change in values of weighting coefficients for eigenvectors of principal components obtained through principal component analysis on the face shape.

S and S0 are shape vectors represented respectively by simply listing the coordinates of the feature points (x1, y1, . . . , x122, y122) in the face shape and in the mean face shape, while pi and bi are an eigenvector representing the i$^{th}$ principal component for the face shape obtained by the principal component analysis and a weight coefficient therefor, respectively. FIG. 6 shows how face shape changes with change in values of the weight coefficients b1 and b2 for the eigenvectors p1 and p2 as the highest and second-highest order principal components obtained by the principal component analysis. The change ranges from −3sd to +3sd where sd refers to standard deviation of each of the weighting coefficients b1 and b2 in the case where the face shape in each of the sample images is represented by Equation (1). The face shape in the middle of 3 faces for each of the components represents the face shape in the case where the values of the weighting coefficients are the mean values. In this example, a component contributing to face outline has been extracted as the first principal component through the principal component analysis. By changing the weighting coefficient b1, the face shape changes from an elongated shape (corresponding to −3sd) to a round shape (corresponding to +3sd). Likewise, a component contributing to how much the mouth is open and to length of chin has been extracted as the second principal component. By changing the weight coefficient b2, the face changes from a state of open mouth and long chin (corresponding to −3sd) to a state of closed mouth and short chin (corresponding to +3sd). The smaller the value of i, the better the component explains the shape. In other words, the $i^{th}$ component contributes more to the face shape as the value of i becomes smaller.

Each of the sample images is then subjected to conversion (warping) into the mean face shape obtained at Step #2 (Step #4). More specifically, shift values are found between each of the sample images and the mean face shape, for the respective feature points. In order to warp pixels in each of the sample images to the mean face shape, shift values to the mean face shape are calculated for the respective pixels in each of the sample images according to 2-dimensional 5-degree polynomials (2) to (5) using the shift values having been found:

$$x' = x + \Delta x \tag{2}$$

$$y' = y + \Delta y \tag{3}$$

$$\Delta x = \sum_{i=0}^{n} \sum_{j=0}^{n-i} a_{ij} \cdot x^i \cdot y^j \tag{4}$$

$$\Delta y = \sum_{i=0}^{n} \sum_{j=0}^{n-i} b_{ij} \cdot x^i \cdot y^j \tag{5}$$

Figure 7:
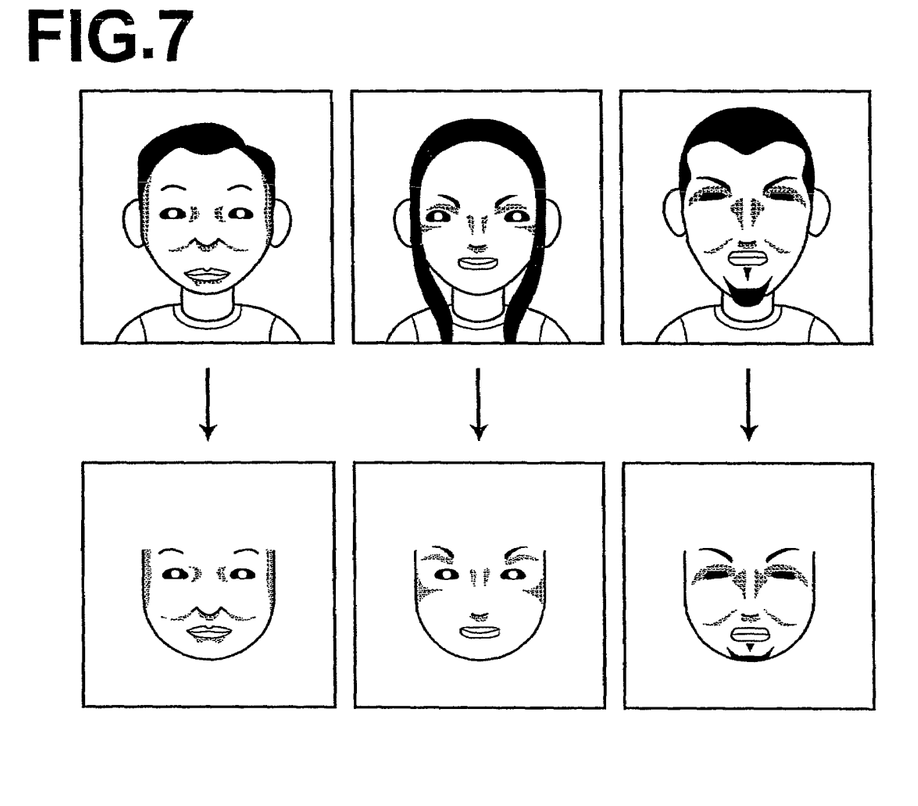
FIG. 7 shows luminance in mean face shapes converted from face shapes in sample images.

In Equations (2) to (5) above, x and y denote the coordinates of each of the feature points in each of the sample images while x' and y' are coordinates in the mean face shape to which x and y are warped. The shift values to the mean shape are represented by $\Delta x$ and $\Delta y$ with n being the number of dimensions while $a_{ij}$ and $b_{ij}$ are coefficients. The coefficients for polynomial approximation can be found by using a least square method. At this time, for a pixel to be moved to a position represented by non-integer values (that is, values including decimals), pixel values therefor are found through linear approximation using 4 surrounding points. More specifically, for 4 pixels surrounding coordinates of the non-integer values generated by warping, the pixel values for each of the 4 pixels are determined in proportion to a distance thereto from the coordinates generated by warping. FIG. 7 shows how the face shape of each of 3 sample images is changed to the mean face shape.

Thereafter, principal component analysis is carried out, using as variables the values of RGB colors of each of the pixels in each of the sample images after the change to the mean face shape (Step #5). As a result, the pixel values of RGB colors in the mean face shape converted from any arbitrary face image can be approximated by Equation (6) below:

$$A = A_0 + \sum_{i=1}^{m} q_i \lambda_i \tag{6}$$

In Equation (6), A denotes a vector (r1, g1, b1, r2, g2, b2, ..., rm, gm, bm) represented by listing the pixel values of RGB colors at each of the pixels in the mean face shape (where r, g, and b represent the pixel values of RGB colors while 1 to m refer to subscripts for identifying the respective pixels with m being the total number of pixels in the mean face shape). The vector components are not necessarily listed in this order in the example described above. For example, the order may be (r1, r2, ..., rm, g1, g2, ..., gm, b1, b2, ..., bm). A0 is a mean vector represented by listing mean values of the RGB values at each of the pixels in the mean face shape while $q_i$ and $\lambda_i$ refer to an eigenvector representing the $i^{th}$ principal component for the RGB pixel values in the face obtained by the principal component analysis and a weight coefficient therefor, respectively. The smaller the value of i is, the better the component explains the RGB pixel values. In other words, the component contributes more to the RGB pixel values as the value of i becomes smaller.

Figure 8:
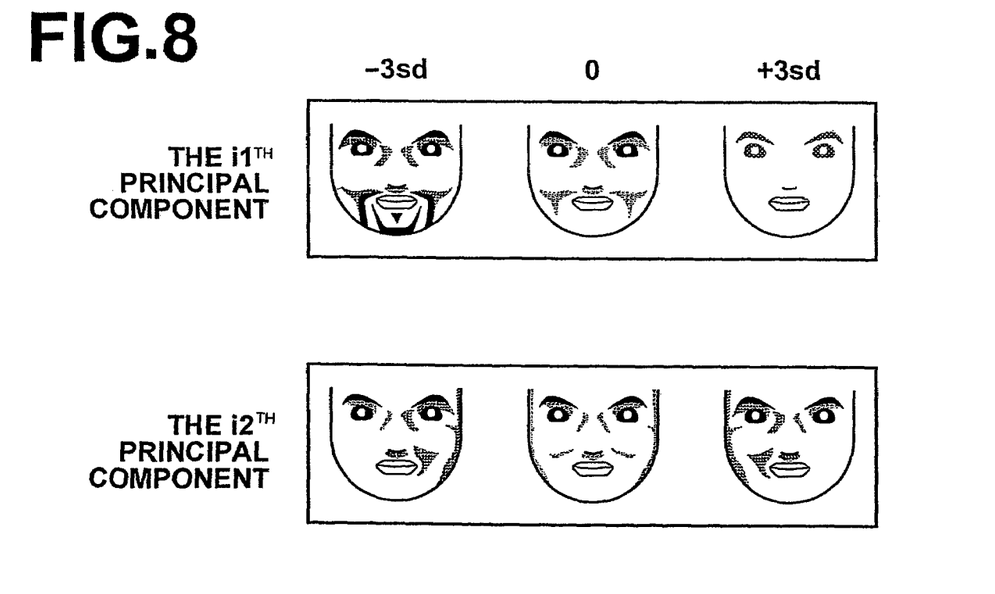
FIG. 8 shows how pixel values in a face change with change in values of weighting coefficients for eigenvectors of principal components obtained by principal component analysis on the pixel values in the face.

FIG. 8 shows how faces change with change in values of the weight coefficients $\lambda i1$ and $\lambda i2$ for the eigenvectors qi1 and qi2 representing the $i1^{th}$ and $i2^{th}$ principal components obtained through the principal component analysis. The change in the weight coefficients ranges from −3sd to +3sd where sd refers to standard deviation of each of the values of the weight coefficients $\lambda i1$ and $\lambda i2$ in the case where the pixel values in each of the sample face images are represented by Equation (6) above. For each of the principal components, the face in the middle of the 3 images corresponds to the case where the weight coefficients $\lambda i1$ and $\lambda i2$ are the mean values. In the examples shown in FIG. 8, a component contributing to presence or absence of beard has been extracted as the $i1^{th}$ principal component through the principal component analysis. By changing the weight coefficient $\lambda i1$, the face changes from the face with dense beard (corresponding to −3sd) to the face with no beard (corresponding to +3sd). Likewise, a component contributing to how a shadow appears on the face has been extracted as the $i2^{th}$ principal component through the principal component analysis. By changing the weight coefficient $\lambda i2$, the face changes from the face with a shadow on the right side (corresponding to −3sd) to the face with a shadow on the left side (corresponding to +3sd). How each of the principal components contributes to what factor is determined through interpretation.

In this embodiment, the plurality of human face images under different lighting conditions have been used as the sample images. Therefore, components contributing to difference in the lighting conditions are extracted as the principal components. For example, components contributing to intensity of light emission, the number of light sources (such as whether the light sources are light sources of single type or mixed light sources comprising a plurality of light sources of different types), a color of light, and a light source direction are extracted as the principal components.

Assume that the component contributing to the intensity of light emission has been extracted as the $i^{th}$ principal component. With change in the weight coefficient $\lambda i$ for the eigenvector q1 in the $i^{th}$ principal component, the face region P1f in the image P1 changes from a dark face to a light face.

In the case where the component contributing to color temperature has been extracted as the $i^{th}$ principal component, a tone of the face region P1f in the image P1 changes from reddish (low color temperature) to bluish (high color temperature) with change in the weight coefficient λi for the eigenvector q1 of the $i^{th}$ principal component.

In the case where the component contributing to the number of light sources has been extracted as the $i^{th}$ principal component, lightness of the face region P1f in the image P1 changes according to the type of the light sources, with change in the weight coefficient λi for the eigenvector q1 of the $i^{th}$ principal component.

Furthermore, if the $i^{th}$ principal component is the component contributing to difference in the direction of light source, a position of a shadow in the face region P1f in the image P1 changes with change in the weight coefficient λi for the eigenvector q1 of the $i^{th}$ principal component.

The difference in the lighting conditions is not necessarily represented by a plurality of principal components, and only one principal component may explain the difference in some cases.

Through the processing from Step #1 to #5 described above, the mathematical model M can be generated. In other words, the mathematical model M is represented by the eigenvectors pi representing the face shape and the eigenvectors qi representing the pixel values in the mean face shape, and the number of the eigenvectors is far smaller for pi and for qi than the number of pixels forming the face image. In other words, the mathematical model M has been compressed in terms of dimension. In the example described in Reference 1, 122 feature points are set for a face image of approximately 10,000 pixels, and a mathematical model of face image represented by 23 eigenvectors for face shape and 114 eigenvectors for face pixel values has been generated through the processing described above. By changing the weight coefficients for the respective eigenvectors, approximately 98% of variations in face shape and pixel values can be expressed.

Hereinafter, the flash control processing based on the method of AAM using the mathematical model M will be described with reference to FIG. 3.

The face detection unit 31 firstly reads the image data P1, and detects the face region P1f in the image P1. More specifically, the face region can be detected through various known methods such as a method using a correlation score between an eigen-face representation and an image as has been described in Published Japanese Translation of a PCT Application No. 2004-527863 (hereinafter referred to as Reference 2). Alternatively, the face region can be detected by using a knowledge base, characteristics extraction, skin-color detection, template matching, graph matching, and a statistical method (such as a method using neural network, SVM, and HMM), for example. Furthermore, the face region P1f may be specified manually with use of the operation unit 76 when the image P1 is displayed on the LCD. Alternatively, a result of automatic detection of the face region may be corrected manually.

Thereafter, the parameter acquisition unit 32 carries out processing for fitting the mathematical model M to the face region P1f. More specifically, an image is reconstructed according to Equations (1) and (6) described above while sequentially changing the values of the weight coefficients bi and λi for the eigenvectors pi and qi corresponding to the principal components in order of higher order in Equations (1) and (6). The values of the weighting coefficients bi and λi causing a difference between the reconstructed image and the face region P1f to become minimal are then found (see Reference 2 for details). Among the weighting coefficients λi, the weighting parameters λi corresponding the lighting conditions are the parameters C. It is preferable for the values of the weighting coefficients bi and λi to range only from −3sd to +3sd where sd refers to the standard deviation in each of distributions of bi and λi when the sample images used at the time of generation of the model are represented by Equations (1) and (6). In the case where the values do not fall within the range, it is preferable for the weighting coefficients to take the mean values in the distributions. In this manner, erroneous application of the model can be avoided.

Figure 9:
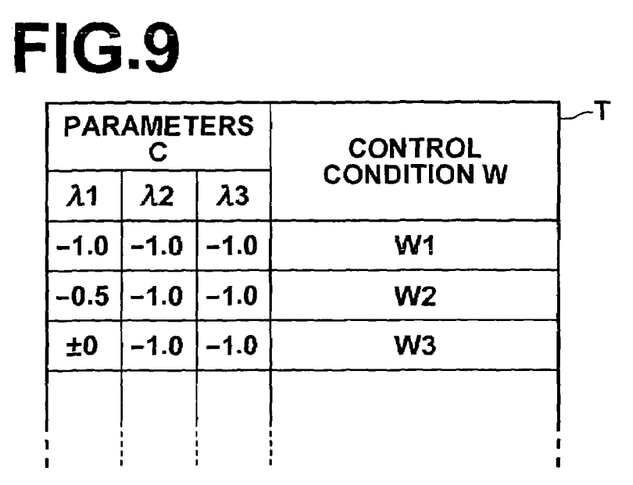
FIG. 9 shows an example of a reference table used in the flash control processing in the present invention.

The flash control unit 33 obtains the control condition W with reference to the reference table T according to the parameters C. The reference table T will be described next. FIG. 9 shows the reference table T. As shown in FIG. 9, the reference table T relates the content of the parameters C (that is, a combination of the weighting coefficients λi in the $K^{th}$ principal component) with the flash control condition W. In FIG. 9, the weighting coefficients λ1 to λ3 for the first to third principal components in this embodiment determine the flash control condition W. However, the content of the table T may be determined according to the number of the principal components representing the difference in the lighting conditions and a combination thereof. The reference table T here relates the content of the parameters found experimentally and statistically in advance with the control condition W.

The control condition W determines use or non-use of the flash unit 75, intensity of light emission, the type of flash used in the case where the flash unit 75 has a plurality of flashes, for example. In the case where the parameters C represent mixed light sources, the control condition W is a condition to turn on the flash unit 75 so as to cancel the state of mixed light sources. In the case where emission of auxiliary light from the flash unit 75 results in presence of mixed light sources, the control condition W is a condition for not causing the state of mixed light sources by adjusting the color temperature of the light emitted from the flash unit 75, or a condition for emitting the light so as to illuminate a range of entire view angle by adjusting a distance traveled by the light emitted from the flash unit 75. In the latter case, the control condition can deal with the case where the face of a person with a hat is in shade among a plurality of people, for example.

In the above description, the control condition W is determined based on the combination of the values of the weighting coefficients (such as λ1, λ2, . . . , λJ) for the principal components representing the lighting conditions. However, the parameters C may be found as a linear combination of the weighting coefficients as shown by Equation (7) below wherein αi is a coefficient representing a rate of contribution of the $i^{th}$ principal component corresponding to the weighting coefficient λi to the lighting conditions:

$$C = \sum_{i=1}^{J} \alpha_i \lambda_i \qquad (7)$$

Alternatively, the control condition W may be found according to a reference table of higher dimensions relating the combination of the values of the weighting coefficients with the values of the parameters C. Furthermore, a function using the weight coefficients λ1, λ2, . . . , λJ as input and outputting the control condition W may be defined so that the control condition W can be determined based on the function.

The flash control unit 33 then controls emission of light from the flash unit 75, based on the control condition W having been determined for the flash unit 75.

As has been described above in the flash control processing in the embodiment of the present invention, the parameter acquisition unit 32 fits, to the face region P1f detected by the face detection unit 31 in the image P1, the mathematical model M generated according the method of AAM using the sample images representing human faces in different lighting conditions. The parameter acquisition unit 32 obtains the weighting parameters C corresponding to the principal components representing the lighting conditions in the face region P1f, and the flash control unit 33 obtains the control condition W for the flash unit 75 by referring to the reference table T based on the parameters C having been obtained. Emission of light from the flash unit 75 is then controlled based on the control condition W. In this manner, attention is paid to the parameters C corresponding to the principal components representing the lighting conditions, and the flash unit 75 is caused to emit light in appropriate condition corresponding to the values of the parameters. Consequently, photography can be carried out with less effect of density contrast caused by shadow or black or white compression.

Figure 10:
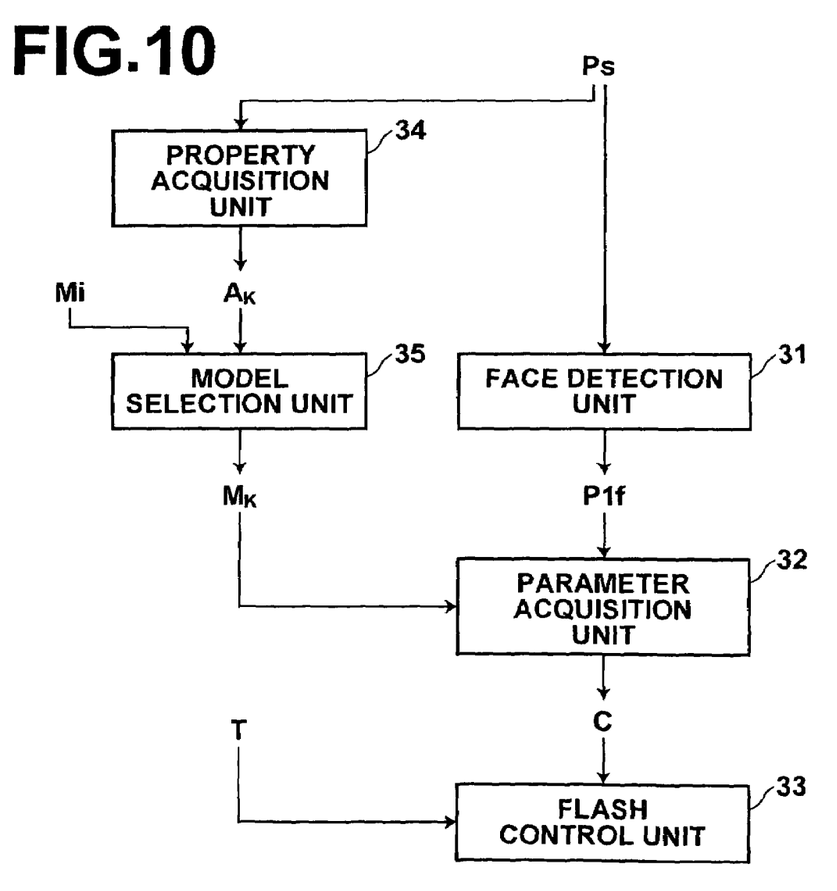
FIG. 10 is a block diagram showing an advanced aspect of the flash control processing in the present invention.

In the embodiment described above, the mathematical model M is unique. However, a plurality of mathematical models Mi (i=1, 2, . . . ) may be generated for respective properties such as race, age, and gender, for example. FIG. 10 is a block diagram showing details of flash control processing in this case. As shown in FIG. 10, a property acquisition unit 34 and a model selection unit 35 are added, which is different from the embodiment shown in FIG. 3. The property acquisition unit 34 obtains property information AK of the subject, based on the through image Ps. The model selection unit 35 selects a mathematical model MK generated only from sample images representing subjects having a property represented by the property information AK.

The mathematical models Mi have been generated based on the same method (see FIG. 4), only from sample images representing subjects of the same race, age, and gender, for example. The mathematical models Mi are stored by being related to property information Ai representing each of the properties that is common among the samples used for the model generation.

The property acquisition unit 34 may obtain the property information AK by judging the property of the subject through execution of known recognition processing (such as processing described in Japanese Unexamined Patent Publication No. 11(1999)-175724) on the through image Ps. Alternatively, the property information AK may be obtained through input thereof from the operation unit 76 at the time of photography. In the case where GPS information representing a photography location is available, the country or a region corresponding to the GPS information can be identified. Therefore, the race of the subject can be inferred to some degree. By paying attention to this fact, a reference table relating GPS information to information on race may be generated in advance. By installing a GPS function to the digital camera and by obtaining the GPS information at the time of photography, the information on race related to the GPS information may be inferred as the race of the subject when the reference table is referred to according to the GPS information.

The model selection unit 35 obtains the mathematical model MK related to the property information AK obtained by the property acquisition unit 34, and the parameter acquisition unit 32 fits the mathematical model MK to the face region P1f.

As has been described above, in the case where the mathematical models Mi corresponding to the properties have been prepared, if the model selection unit 35 selects the mathematical model MK related to the property information AK obtained by the property acquisition unit 34 and if the parameter acquisition unit 32 fits the selected mathematical model MK to the face region P1f, the mathematical model MK does not have eigenvectors contributing to variations in face shape and luminance caused by difference in the property information AK. Therefore, the face region P1f can be represented only by eigenvectors representing factors determining the face shape and luminance other than the factor representing the property. Consequently, processing accuracy improves, and photography can be carried out in higher quality.

From a viewpoint of improvement in processing accuracy, it is preferable for the mathematical models for respective properties to be specified further so that a mathematical model for each individual as a subject can be generated. In this case, the through image Ps needs to be related to information identifying each individual.

A person as a subject of photography is often fixed to some degree for each digital camera. Therefore, if a mathematical model is generated for the face of each individual as a frequent subject of photography with the digital camera, a model without variation of individual difference in face can be generated. Consequently, density correction processing can be carried out with extremely high accuracy for the face of the person.

In the embodiment described above, the mathematical models are stored in the internal memory 79 in advance. However, from a viewpoint of processing accuracy improvement, it is preferable for mathematical models for different human races to be prepared so that which of the mathematical models is to be stored can be changed according to a country or region to which the digital camera is going to be shipped.

In the embodiment described above, the individual face image is represented by the face shape and the weighting coefficients bi and λi for the pixel values of RGB colors. However, the face shape is correlated to variation in the pixel values of RGB colors. Therefore, a new appearance parameter c can be obtained for controlling both the face shape and the pixel values of RGB colors as shown by Equations (8) and (9) below, through further execution of principal component analysis on a vector (b1, b2, . . . , bi, . . . , λ1, λ2, . . . , λi, . . . ) combining the weighting coefficients bi and λi:

$$S = S_0 + Q_S c \quad (8)$$

$$A = A_0 + Q_A c \quad (9)$$

A difference from the mean face shape can be represented by the appearance parameter c and a vector QS, and a difference from the mean pixel values can be represented by the appearance parameter c and a vector QA.

In the case where this model is used, the parameter acquisition unit 32 finds the face pixel values in the mean face shape based on Equation (9) above while changing a value of the appearance parameter c. Thereafter, the face image is reconstructed by conversion from the mean face shape according to Equation (8) above, and the value of the appearance parameter c causing a difference between the reconstructed face image and the face region P1f to be minimal is found.

In the embodiment described above, the flash control unit 33 may judge presence of backlight so that the control condition W can be determined in consideration of backlight if the backlight is present. As a method of judging presence of backlight, any known method can be used. For example, in the input through image Ps, density of an entire image and density of a face may be found respectively so that backlight is judged to be present in the case where the face is darker than the entire image. In the case where presence of backlight is considered, it is preferable for the reference-table T to have been generated in consideration of presence of backlight. The control condition W is determined based on the parameters C and a result of the judgment on presence or absence of backlight, with reference to the reference table T.

Figure 11:
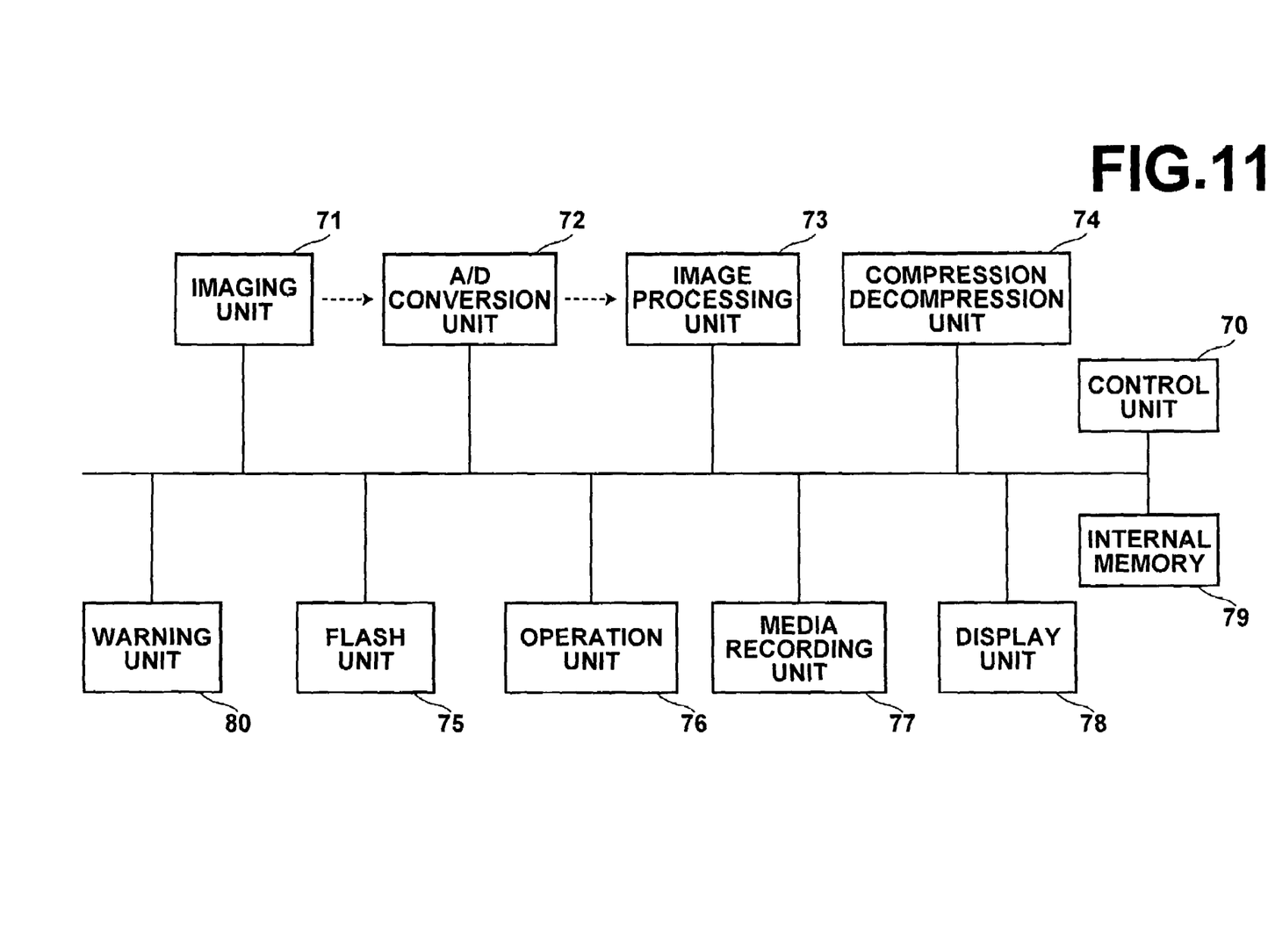
FIG. 11 is shows the configuration of a digital camera in another embodiment of the present invention.

Another embodiment of the present invention will be described next. FIG. 11 is shows the configuration of a digital camera in this embodiment. For the same components as in the embodiment shown in FIG. 1, the same reference numbers are used, and detailed description thereof will be omitted. In the embodiment shown in FIG. 11, the digital camera comprises a warning unit 80 for carrying out warning in the case where the values of the parameters having been found do not satisfy predetermined conditions T1 representing preferable lighting conditions, which is different from the embodiment shown in FIG. 1. Unlike the embodiment shown in FIG. 1, flash control processing is not carried out in this embodiment.

Figure 12:
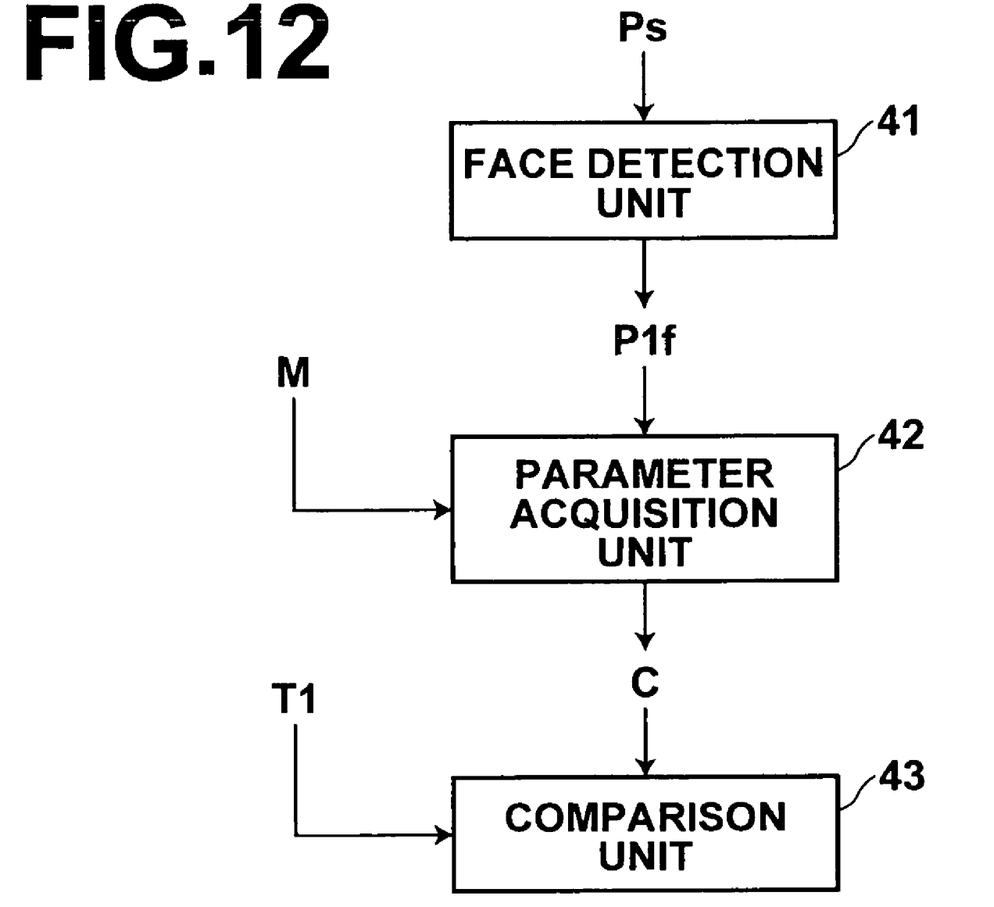
FIG. 12 is a block diagram showing details of warning processing as another aspect of the present invention.

FIG. 12 is a block diagram representing details of warning processing carried out in this embodiment. As shown in FIG. 12, this warning processing is carried out by a face detection unit 41, a parameter acquisition unit 42, and a comparison unit 43. The face detection unit 41 detects the face region P1$f$ in the through image Ps. The parameter acquisition unit 42 obtains the weighting parameters C for the principal components representing lighting conditions in the face region P1$f$ by fitting to the detected face region P1$f$ the mathematical model M generated according to the method of AAM (see Reference 1 described above) using the plurality of sample images representing human faces in difference lighting conditions. The comparison unit 43 compares the weighting parameters C with the predetermined conditions T1. This processing described above is carried out according to a control program stored in the internal memory 79. The face detection unit 41 and the parameter acquisition unit 42 carry out the same processing as the face detection unit 31 and the parameter acquisition unit 32. Therefore, detailed description thereof is omitted.

The comparison unit 43 compares the parameters having been found and the conditions T1 representing the predetermined preferable lighting conditions. In the case where the parameters C comprise weighting coefficients for a plurality of principal components, a preferable combination of the weighting coefficients is used as the predetermined conditions T1. In the case where the parameters C do not satisfy the predetermined conditions T1, the comparison unit 43 outputs to the warning unit 80 information representing the fact that the parameters C do not satisfy the predetermined conditions T1.

The warning unit 80 receives input of the information representing the fact, and carries out warning by an audio message or display by the display unit 78. More specifically, an audio message is output or a message is displayed in response to the fact, for causing a photographer to set a control condition for the flash unit 75.

In this manner, the photographer operates the operation unit 76, and can adjust light emission from the flash unit 75.

What is claimed is:

1. A photography apparatus comprising:
   imaging means for obtaining an image of a subject by photography thereof;
   an auxiliary light source for emitting auxiliary light at the time of the photography;
   parameter acquisition means for obtaining a weighting parameter for a statistical characteristic quantity representing a lighting condition for a predetermined structure in an input through image by fitting a model representing the structure to the structure in the input through image, the model having been obtained by carrying out predetermined statistical processing on a plurality of images representing the predetermined structure in different lighting conditions, and the model representing the structure by one or more statistical characteristic quantities including the statistical characteristic quantity representing the lighting condition and by weighting parameter or parameters for weighting the statistical characteristic quantity or quantities according to an individual characteristic of the structure; and
   auxiliary light source control means for controlling the auxiliary light source so as to cause a condition of lighting for the subject to become appropriate according to a value of the weighting parameter having been obtained.

2. The photography apparatus according to claim 1, wherein the predetermined structure is a human face.

3. The photography apparatus according to claim 1 further comprising detection means for detecting the structure in the input through image, wherein
   the parameter acquisition means obtains the weighting parameter by fitting the model to the structure having been detected.

4. The photography apparatus according to claim 3, further comprising model selection means for selecting the model representing the structure from at least one model having a property represented in the structure having being detected by the detection means.

5. The photography apparatus according to claim 1 further comprising selection means for obtaining a property of the structure in the input through image and for selecting the models corresponding to the obtained property from a plurality of the models representing the structure for respective properties of the predetermined structure, wherein
   the parameter acquisition means obtains the weighting parameter by fitting the selected model to the structure in the input through image.

6. The photography apparatus according to claim 1, wherein the different lighting conditions include a presence or absence of light emitted from the auxiliary light source, an intensity of light emitted, a color of light emitted, and a light source direction in the case of presence of a plurality of light sources.

7. The photography apparatus according to claim 1, wherein the input through image is generated by serially imaging the subject at a predetermined frame rate.

8. A photography apparatus comprising:
   imaging means for obtaining an image of a subject by photography thereof;
   parameter acquisition means for obtaining a weighting parameter for a statistical characteristic quantity representing a lighting condition for a predetermined structure in an input through image by fitting a model representing the structure to the structure in the input through image, the model having been obtained by carrying out predetermined statistical processing on a plurality of images representing the predetermined structure in different lighting conditions, and the model representing the structure by one or more statistical characteristic quantities including the statistical characteristic quantity representing the lighting condition and by weighting parameter or parameters for weighting the statistical characteristic quantity or quantities according to an individual characteristic of the structure;
   judging means for carrying out judgment as to whether a value of the weighting parameter having been obtained satisfies a predetermined criterion representing a preferable lighting condition; and
   warning means for carrying out warning in the case where a result of the judgment is negative.

9. A photography method comprising the steps of:
obtaining a weighting parameter for a statistical characteristic quantity representing a lighting condition for a predetermined structure in an input through image by fitting a model representing the structure to the structure in the input through image, the model having been obtained by carrying out predetermined statistical processing on a plurality of images representing the predetermined structure in different lighting conditions, and the model representing the structure by one or more statistical characteristic quantities including the statistical characteristic quantity representing the lighting condition and by weighting parameter or parameters for weighting the statistical characteristic quantity or quantities according to an individual characteristic of the structure; and
controlling an auxiliary light source emitting auxiliary light at the time of photography of a subject so as to cause a condition of lighting for the subject to become appropriate according to a value of the weighting parameter having been obtained.

10. A photography method comprising the steps of:
obtaining a weighting parameter for a statistical characteristic quantity representing a lighting condition for a predetermined structure in an input through image by fitting a model representing the structure to the structure in the input through image, the model having been obtained by carrying out predetermined statistical processing on a plurality of images representing the predetermined structure in different lighting conditions, and the model representing the structure by one or more statistical characteristic quantities including the statistical characteristic quantity representing the lighting condition and by weighting parameter or parameters for weighting the statistical characteristic quantity or quantities according to an individual characteristic of the structure;
carrying out judgment as to whether a value of the weighting parameter having been obtained satisfies a predetermined criterion representing a preferable lighting condition; and
carrying out warning in the case where a result of the judgment is negative.

11. A computer-readable medium embodied with a photography program for causing a computer to function as:
parameter acquisition means for obtaining a weighting parameter for a statistical characteristic quantity representing a lighting condition for a predetermined structure in an input through image by fitting a model representing the structure to the structure in the input through image, the model having been obtained by carrying out predetermined statistical processing on a plurality of images representing the predetermined structure in different lighting conditions, and the model representing the structure by one or more statistical characteristic quantities including the statistical characteristic quantity representing the lighting condition and by weighting parameter or parameters for weighting the statistical characteristic quantity or quantities according to an individual characteristic of the structure; and
auxiliary light source control means for controlling an auxiliary light source emitting auxiliary light at the time of photography of a subject so as to cause a condition of lighting for the subject to become appropriate according to a value of the weighting parameter having been obtained.

12. A computer-readable medium embodied with a photography program for causing a computer to function as:
parameter acquisition means for obtaining a weighting parameter for a statistical characteristic quantity representing a lighting condition for a predetermined structure in an input through image by fitting a model representing the structure to the structure in the input through image, the model having been obtained by carrying out predetermined statistical processing on a plurality of images representing the predetermined structure in different lighting conditions, and the model representing the structure by one or more statistical characteristic quantities including the statistical characteristic quantity representing the lighting condition and by weighting parameter or parameters for weighting the statistical characteristic quantity or quantities according to an individual characteristic of the structure;
judging means for carrying out judgment as to whether a value of the weighting parameter having been obtained satisfies a predetermined criterion representing a preferable lighting condition; and
warning means for carrying out warning in the case where a result of the judgment is negative.

* * * * *